US012422241B2

(12) United States Patent
Asjes et al.

(10) Patent No.: US 12,422,241 B2
(45) Date of Patent: Sep. 23, 2025

(54) CAPACITIVE SENSOR DEVICE AND A MAGNETIC BEARING ASSEMBLY WITH SUCH CAPACITIVE SENSOR DEVICE

(71) Applicant: VDL ENABLING TECHNOLOGIES GROUP B.V., Eindhoven (NL)

(72) Inventors: Ronald Jan Asjes, Eindhoven (NL); Rick Baade, Eindhoven (NL); Hubert Marie Segers, Eindhoven (NL)

(73) Assignee: VDL ENABLING TECHNOLOGIES GROUP B.V., Eindhoven (NL)

( * ) Notice: Subject to any disclaimer, the term of this patent is extended or adjusted under 35 U.S.C. 154(b) by 242 days.

(21) Appl. No.: 18/262,820

(22) PCT Filed: Feb. 8, 2022

(86) PCT No.: PCT/NL2022/050060
§ 371 (c)(1),
(2) Date: Jul. 25, 2023

(87) PCT Pub. No.: WO2022/173290
PCT Pub. Date: Aug. 18, 2022

(65) Prior Publication Data
US 2024/0085165 A1 Mar. 14, 2024

(30) Foreign Application Priority Data

Feb. 11, 2021 (NL) ...................... 2027543

(51) Int. Cl.
*G01B 7/14* (2006.01)
*F16C 32/04* (2006.01)
(52) U.S. Cl.
CPC .......... *G01B 7/144* (2013.01); *F16C 32/0446* (2013.01); *F16C 32/0472* (2013.01)

(58) Field of Classification Search
CPC .. G01B 7/144; F16C 32/0446; F16C 32/0472; F16C 32/0406; F16C 32/044;
(Continued)

(56) References Cited

U.S. PATENT DOCUMENTS 10,796,222 B2 * 10/2020 Kántor ................... G06N 3/063
2006/0273805 A1 * 12/2006 Peng ................... G01R 27/2605
324/686

(Continued)

FOREIGN PATENT DOCUMENTS

DE         4415248 A1    11/1995
WO        96/41999 A1    12/1996
WO       2020/214025 A1  10/2020

OTHER PUBLICATIONS

Islam T., "Advanced interfacing techniques for the capacitive sensors" In: "Advanced Interfacing Techniques for Sensors", 2017, Springer International Publishing Cham, XP009530855, ISBN: 978-3-319-55369-6, vol. 25, pp. 73-109, DOI: 10.1007/978-3-319-55369-6_2, p. 74, lines 5-7, pp. 87, paragraph 5.2, figure 13.

*Primary Examiner* — Ahmed Elnakib
(74) *Attorney, Agent, or Firm* — Procopio, Cory, Hargreaves & Savitch LLP

(57) ABSTRACT

The invention relates a capacitive sensor device for determining a distance between a rigid body and another rigid body in a system for contactless linear displacement along a linear displacement path of the rigid body relative to the other rigid body, the capacitive sensor device comprising a capacitive sensor component with a first sensor node mounted to the rigid body and a second sensor node mounted to the other rigid body; a transmission component having at least a first input node for receiving an input signal as well as an output node for providing an output signal representative of the distance; a frequency-dependent input signal generator operatively connected to the first sensor (Continued)

node of the capacitive sensor component and the first input node of the transmission component being operatively connected to the second sensor node of the capacitive sensor component.

17 Claims, 4 Drawing Sheets

(58) Field of Classification Search
CPC .............. F16C 32/0459; F16C 32/0461; F16C 32/0489; F16C 32/0491; F16C 32/0493; F16C 32/0495; F16C 32/0497
USPC ........................................................ 310/90.5
See application file for complete search history.

(56) References Cited

U.S. PATENT DOCUMENTS

| | | | | |
|---|---|---|---|---|
| 2009/0072644 | A1* | 3/2009 | Han .................... | F16C 32/0446 |
| | | | | 310/90.5 |
| 2013/0057301 | A1* | 3/2013 | Balachandran ..... | G01P 15/0802 |
| | | | | 324/679 |
| 2015/0180493 | A1* | 6/2015 | Liu ........................ | H02M 3/06 |
| | | | | 324/686 |
| 2023/0236225 | A1* | 7/2023 | Dutta .................... | G01R 15/16 |
| | | | | 324/127 |
| 2024/0085165 | A1* | 3/2024 | Asjes .................... | G01B 7/144 |

* cited by examiner

CAPACITIVE SENSOR DEVICE AND A MAGNETIC BEARING ASSEMBLY WITH SUCH CAPACITIVE SENSOR DEVICE

CROSS-REFERENCE TO RELATED APPLICATIONS

This application is US National Stage of International Patent Application PCT/NL2022/050060, filed Feb. 8, 2022, which claims benefit of priority from Dutch Patent Application NL2027543 filed Feb. 11, 2021, the contents of both of which are incorporated herein by reference.

TECHNICAL FIELD

The disclosure relates to the field of contactless linear displacement of a rigid body relative to another rigid body along a linear displacement path using magnetic levitation. In particular the disclosure pertains to a capacitive sensor device for determining a distance between a rigid body and another rigid body in a system for contactless linear displacement along a linear displacement path of the rigid body relative to the other rigid body using magnetic levitation. The disclosure also pertains to a magnetic bearing assembly with such capacitive sensor device as well as a linear guideway assembly implementing one or more such magnetic bearing assemblies with such capacitive sensor device.

BACKGROUND OF THE INVENTION

Magnetic bearing assemblies or in short magnetic bearings could provide an advantageous alternative to conventional rolling element bearings implementing rolling elements or fluid bearings. Given that magnetic bearings are contactless, there is no mechanical friction and thus very little particle generation. Moreover, there is no need for lubrication, which enables in vacuum operation without significant outgassing of molecular contamination. These aspects make that contamination seals can be omitted. The main challenges of applying magnetic bearings in high-tech in-vacuum systems lie in minimization of heat dissipation in the coils, minimizing eddy-current effects, implementation of a stable control system and linearization of the typically non-linear characteristics. And maintaining a cost effective solution.

Magnetic bearing technology is already utilized in industrial applications. Rotary magnetic bearings are commercially available and applied in for example medical systems, turbo molecular vacuum pumps, cryogenic systems and machine tools. Another category are bearingless motors, where the rotor is magnetically suspended. Magnetic levitation is widely used in the actuation of planar stages, typically based on Lorentz forces. A separate type of magnetic bearings is based on reluctance forces, wherein a similar concept can also be used as actuator. Although utilized in other fields, further development of magnetic bearing applications on a commercial scale in for example high cleanliness substrate handling robotics suffer from technological and constructional constraints.

Commonly known magnetic bearing applications are characterized by their limited design dimensions, whereas known magnetic bearing applications with more than one degree of freedom are of a complex design and high price. Additionally, upscale implementation of magnetic bearing applications require the development of magnetic bearings of significant weight, size and cost, whereas conventional rolling element bearings are still available for similar purposes.

Magnetic bearing applications require displacement sensors to measure the magnetic airgap between two rigid bodies in a contactless manner to enable closed-loop feedback control of the linear guideway assembly. Capacitive sensor devices are often applied in these applications. The benefits of using capacitive sensor devices for air gap measurements in a magnetic bearing application are:
- contactless measurement
- high accuracy and high resolution (up to sub-nanometre)
- insensitive to magnetic fields (for magnetic bearing applications)
- no active electrical components present in the sensor probe, thus low energy dissipation in the senor probe and low outgassing of components (suitable for in-vacuum applications).

However, commercially available sensors show several problems, which adversely affect their proper implementation in certain magnetic bearing applications. First, a magnetic bearing application requires an airgap measurement accuracy of approximately 0.1 µm over a measurement range of approximately 0.5-1 mm, for this particular application with relatively "low-end" positioning requirements, thus resulting in a less expensive technical solution. Most commercial capacitive sensors are significantly more accurate. This makes the capacitive sensor devices relatively expensive per measurement axis (degree of freedom). The price heavily impacts the hardware cost of the overall magnetic bearing system, in particular if such system implements multiple degrees of freedom to be monitored and controlled.

Next, the air gap to be measured is typically in the order of 1-2 mm. The force of the magnetic bearing is generated in the centre of the magnetic bearing module. To obey the Abbe measurement principles the airgap should be measured as close as possible to the centre of the bearing module. The form factor of the commercially available capacitive sensor devices requires that the sensors are mounted next to the magnetic bearing module thereby increasing the system dimensions and negatively impacting the system performance.

In particular, known commercially available capacitive sensor devices usually require relatively thick tri-axial cables running from the sensor probe to the processing unit (often placed outside the application environment). For a system with multiple magnetic bearing modules this requires one sensor with one tri-axial cable for each bearing module. The use of multiple tri-axial cables with an inherently relatively high bending stiffness can affect the system design and performance. The proposed magnetic bearing modules are often part of a larger/complex mechanism with multiple degrees of freedom.

Additionally, the use of such capacitive sensor device in high-cleanliness and in-vacuum systems requires the cables to be shielded from the environment. Cable feedthroughs between moving components are often done using cable slabs for linear motion or rotational feedthroughs for rotational motion. The amount of cables, bending stiffness and diameter of the cables increases the dimensions and complexity of the feedthroughs.

SUMMARY OF THE INVENTION

It is an object of the disclosure to provide a capacitive sensor device suitable for determining a airgap distance between a rigid body and another rigid body in a system for contactless linear displacement along a linear displacement path of the rigid body relative to the other rigid body using magnetic levitation, having a less complex and expensive configuration.

According to a first example, the capacitive sensor device comprises a capacitive sensor component with a first sensor node mounted to the rigid body and a second sensor node mounted to the other rigid body; a transmission component having at least a first input node for receiving an input signal as well as an output node for providing an output signal representative of the distance; a frequency-dependent input signal generator operatively connected to the first sensor node of the capacitive sensor component and the first input node of the transmission component being operatively connected to the second sensor node of the capacitive sensor component.

By applying the frequency-dependent input signal generated by the frequency-dependent input signal generator to the target rigid body (first sensor node) instead of having the target rigid body at ground potential, this allows the capacitive sensor's measurement surface mounted to the other rigid body to be kept at virtual ground potential. The frequency-dependent input signal causes a current flow from the target rigid body to virtual ground, depending on the amplitude of the frequency-dependent input signal and the impedance of the capacitive sensor component between the target rigid body and the measurement surface (thus proportional to the air gap/relative distance between sensor nodes).

Also, due to this configuration, as the capacitive sensor's measurement surface mounted to the other rigid body (second sensor node) is effectively at ground potential, an active shielding can be omitted. The absence of an active shielding has several benefits as complex signal cables can be exchanged for a coaxial cable with a smaller diameter and lower bending stiffness. The latter is beneficial in rotary cable feedthroughs. The central conductor of the coaxial cable is used for the measurement signal while the outer conductor is kept at ground potential and used for shielding. Further, the fact that the sensor probe requires fewer active surfaces and insulation layers makes it more suitable for integration inside the magnetic bearing airgap area.

In a further example, at least one filter element is operatively connected to the output node and the first input node of the transmission component. This filter element functions as a reference capacitor. The transmission component applies its output signal at the output node such that the current flowing through the reference capacitor is equal to the current flowing from the target to virtual ground. Thus, the output signal is a measure for the air gap between the target rigid body and the measurement surface of the capacitive sensor device on the other rigid body.

Accordingly, the transmission component is structured to output the output signal in response to a frequency-dependent change of the input signal.

In addition, the transmission component has a second input node operatively connected to ground potential.

Preferably, the transmission component is structured as an operational amplifier with the first input node being the inverting input node and the second input node being the non-inverting input node.

The magnetic bearing assembly according to the disclosure implements a capacitive sensor device according to the disclosure, and further comprises at least one first static back iron being mounted to the rigid body (first sensor node); and at least one magnetic bearing module being mounted to the other rigid body and consisting of at least a ferromagnetic core; a first magnetic element positioned on a first side of the ferromagnetic core facing the first static back iron; and a coil being wound around the ferromagnetic core.

In this example of the magnetic bearing assembly, the second sensor node of the capacitive sensor device is positioned at the first side of the ferromagnetic core.

In addition, the magnetic bearing assembly/the capacitive sensor device comprises a housing, wherein a part of the housing is structured to support the second sensor node of the capacitive sensor on a first part side thereof, the first part side facing away from the first side of the ferromagnetic core. The part of the housing supporting the second sensor node of the capacitive sensor being made of a dielectric material, in particular glass.

The other part of the housing not supporting the second sensor node of the capacitive sensor is operatively connected to ground potential.

In a further example of the capacitive sensor device as well as the magnetic bearing assembly, it further comprises a shielding component mounted to the part of the housing structured to support the second sensor node of the capacitive sensor on a further side thereof, the further part side facing the first side of the ferromagnetic core. This passive shielding is placed behind the measurement area to prevent metallic components from acting as parasitic capacitances and distorting the measurement quality.

In particular the part of the housing supporting the second sensor node of the capacitive sensor has a comb-like area shape. Herewith, any induced eddy currents are minimized as the surface of the part of the housing supporting the second sensor node of the capacitive sensor is located inside the magnetic field of the magnetic bearing module.

BRIEF DESCRIPTION OF THE DRAWINGS

The invention will now be discussed with reference to the drawings, which show in.

DETAILED DESCRIPTION OF THE INVENTION

Figure 1:
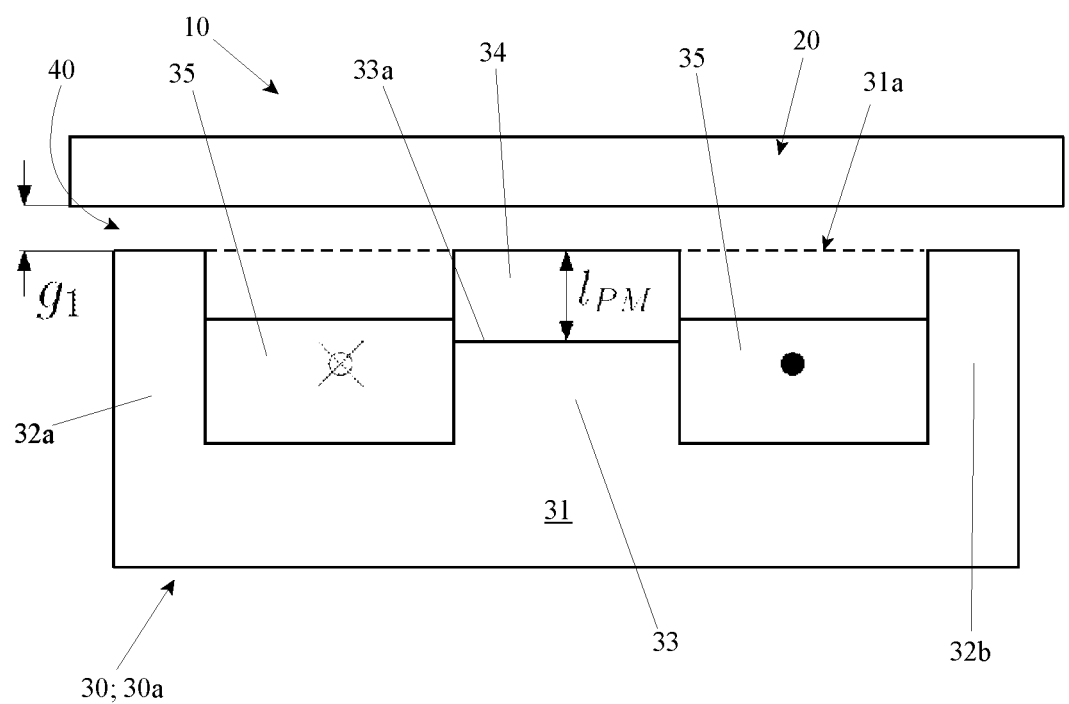
FIG. 1 a schematic example of an embodiment of a magnetic bearing assembly.

For a proper understanding of the invention, in the detailed description below corresponding elements or parts of the invention will be denoted with identical reference numerals in the drawings.

A schematic example of a variable reluctance magnetic bearing assembly suitable to implement a capacitive sensor device according to the disclosure is depicted in FIG. 1. The magnetic bearing assembly of FIG. 1 is denoted with reference numeral 10 and allows a contactless linear displacement (or a single translational degree of freedom) of a rigid body relative to another rigid body along a linear displacement path. In FIG. 1 one of said rigid bodies is denoted with reference numeral 20, whereas the other rigid body is denoted with reference numeral 30.

For the sake of clarity, in an example a linear guideway assembly is composed of a rigid body 30 formed as a linear guideway, which defines a linear displacement path. Along said linear guideway one or more rigid bodies 20 formed as product carriers are displaceable using magnetic levitation along.

The magnetic bearing assembly 10 comprises at least one bearing module 30' (31-35), which is mounted to one of said rigid bodies 30 and consisting of at least a ferromagnetic core 31. For the sake of the understanding of the disclosure it should be noted that any ferromagnetic core design can be implemented. However in the example of FIG. 1 the ferromagnetic core 31 is an E-core having a base 31*a*, a center leg 33 and two outer legs 32*a*-32*b*. On a first side (denoted with the dashed line 31*a*) of the ferromagnetic core 31 a first magnetic element 34 is positioned and in this example the first end of the ferromagnetic core 31 is defined being located at the free end face 33*a* of the central leg 33. Also in this example a coil 35 is wound around the center leg 33 of the E-core.

However it is noted that any ferromagnetic core design having a coil wound around its core element and optionally a magnetic element positioned on a first side 31*a* of the ferromagnetic core 31 can be implemented in the magnetic bearing assembly 10.

In addition the magnetic bearing assembly 10 exhibits at least a first static back iron or back bearing 20 being mounted to (or being part of) the other one of said rigid bodies 20 (the displaceable product carrier) and positioned, during use, at some gap distance 40, indicated with g1 in FIG. 1, from said one bearing module 31-34.

Preferably, but no necessarily the ferromagnetic core being designed as an E-core 31 consists of a laminated E-core and the first magnetic element 34 is construed as a permanent magnet 34.

During use or during operation, the first static back bearing or back iron 20 is placed at a gap distance 40 (g1) from the E-core assembly 31-34-35. This configuration defines a low reluctance path, where the resulting magnetic flux density in the air gap g1 defined by the gap distance 40 will yield a gap dependent attraction force between the E-core assembly 31-34-35 (and as such the one rigid body 30) relative to the other rigid body, which is schematically depicted as the first static back bearing (back iron) 20.

The coil 35 being wound around the central leg or tooth 35 of the E-core 31 is used to either magnify or reduce the magnetic flux density in the air gap g1 (40), based on the direction and magnitude of an electric current running through the coil 35. It is noted, that the magnetic bearing assembly 10 (in fact the at least one bearing module 31-34-51) can only generate an attraction force and no repelling force between the E-core 31 and the first static back bearing (back iron) 20.

Magnetic bearing applications require displacement sensors to measure the magnetic airgap g1 (40) between the two rigid bodies 20 and 30 in a contactless manner to enable closed-loop feedback control of the linear guideway assembly. Capacitive sensor devices are often applied in these applications.

Figure 2:
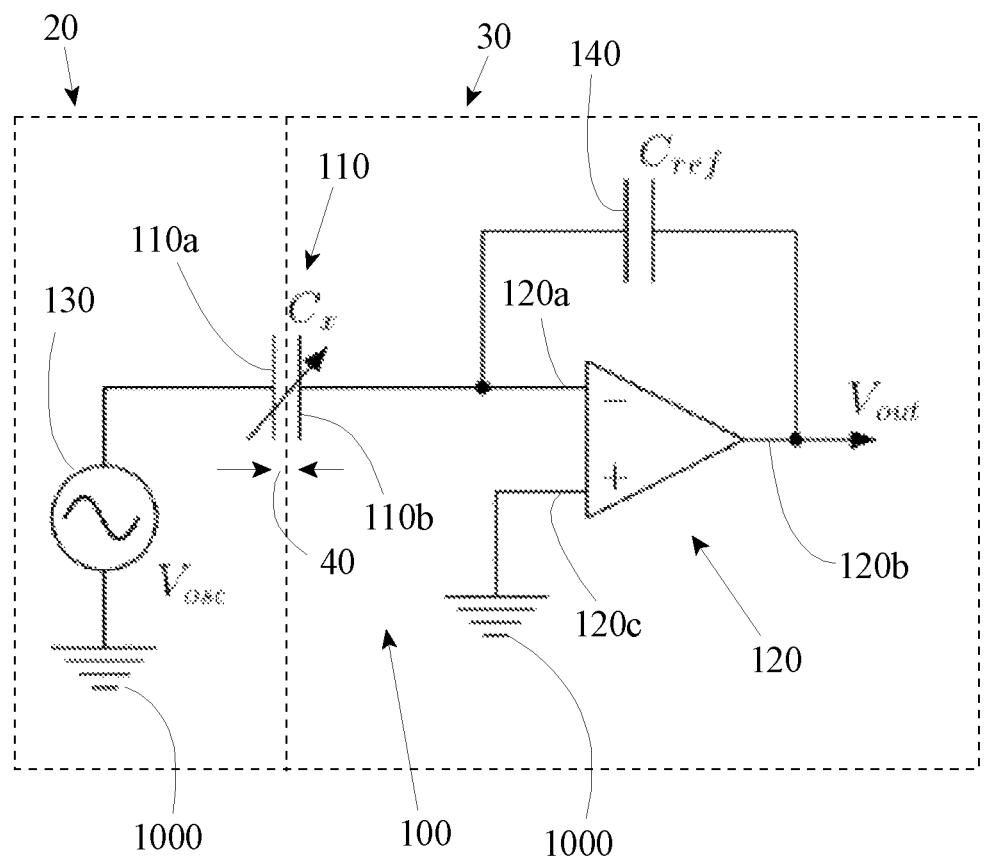
FIG. 2 a schematic example of an embodiment of a capacitive sensor device according to the disclosure.
Figure 3:
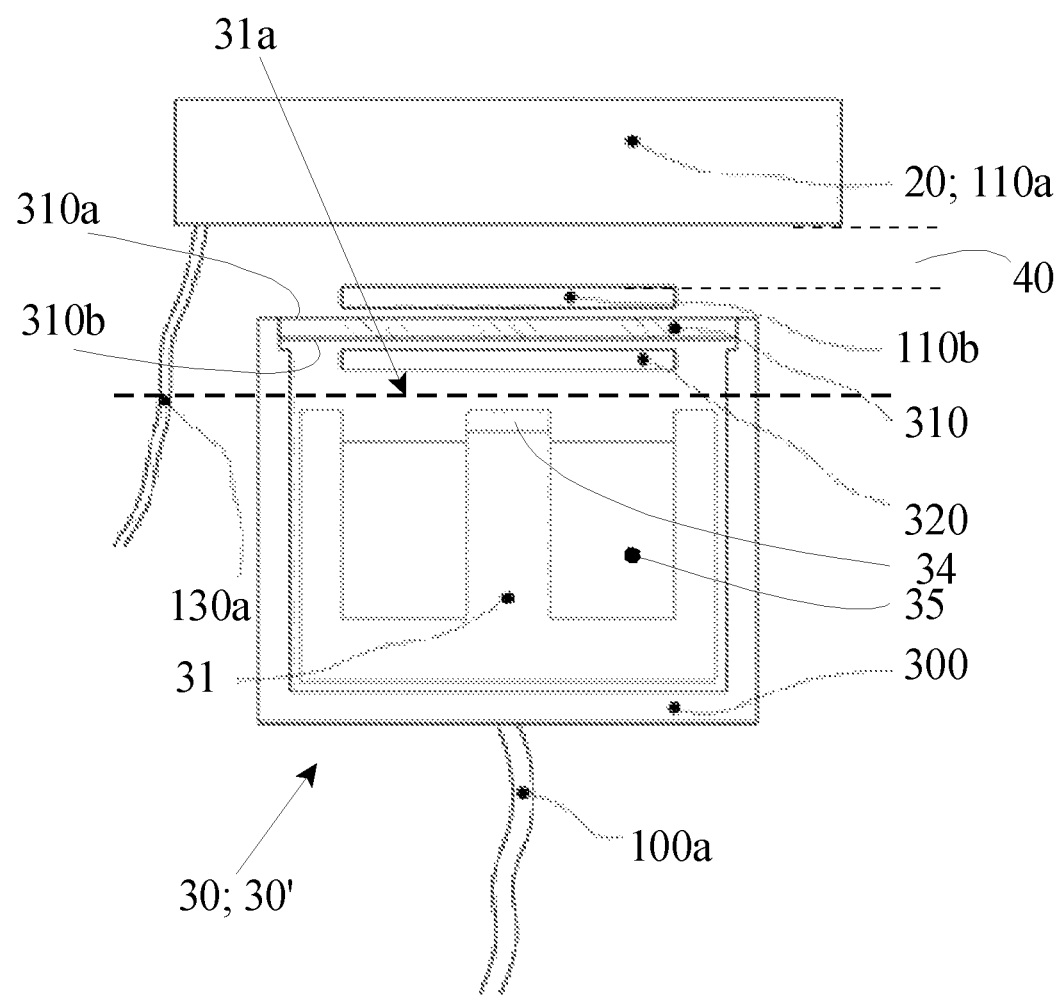
FIG. 3 a schematic example of an embodiment of a magnetic bearing assembly incorporating a capacitive sensor device according to the disclosure.

An example of a capacitive sensor device for determining a distance between a rigid body and another rigid body in a system for contactless linear displacement along a linear displacement path of the rigid body relative to the other rigid body according to the invention is depicted in FIG. 2 and in FIG. 3.

The capacitive sensor device is denoted with reference numeral 100 and comprises a capacitive sensor component 110. The capacitive sensor component 110 is provided with a first sensor node 110*a*, which is coupled or mounted to the rigid body 20 (the displaceable product carrier). Similarly, the capacitive sensor component 110 is provided with a second sensor node 110*b* coupled or mounted to the other rigid body 30 (the linear guideway). Both first and second sensor nodes 110*a*-110*b* are mounted in closed proximity of each other, forming a capacitance $C_x$ and thus allowing the contactless sensing of the distance of the airgap g1 (40) between both rigid bodies 20 and 30.

The capacitive sensor component 110 also comprises a transmission component, denoted with reference numeral 120, which transmission component is in this embodiment mounted to the other rigid body 30. The transmission component 120 has at least a first input node 120*a*, which is operatively connected to the second sensor node 110*b* of the capacitive sensor component 110. Thus, during operation, the transmission component 120 will receive an input signal from the capacitive sensor component 110, which input signal is outputted by the second sensor node 110*b* and inputted to first input node 120*a* of the transmission component 120.

The transmission component 120 also comprises an output node 120*b* for providing an output signal Vow, which representative of the distance g1 (40) between the two rigid bodies 20 and 30 and being detected by the sensor nodes 110*a*-110*b* of the capacitive sensor component 110.

The capacitive sensor device 100 furthermore comprises a frequency-dependent input signal generator 130. The frequency-dependent input signal generator 130 is operatively connected to both the earth or ground potential 1000 and the first sensor node 110*a* of the capacitive sensor component 110 and is capable of applying an oscillating voltage signal $V_{osc}$ to the first sensor node 110*a*.

Also depicted in FIG. 2, is at least one filter element 140 ($C_{ref}$), which is operatively connected to the output node 120*b* as well as the first input node 120*a* of the transmission component 120. The transmission component 120 also comprises a second input node 120*c*, which in this example is operatively connected to ground potential 1000.

For a proper operation of the capacitive sensor device according to the invention, thus generating an accurate measurement of the airgap g1 (40) between the rigid bodies 20 and 30, the transmission component 120 is structured to output the output signal $V_{ref}$ via the output node 120*b* in response to a frequency-dependent change of the input signal being generated by the capacitive sensor component 110, based on the oscillating voltage signal $V_{osc}$ being applied to the first sensor node 110*a* and the actual airgap distance g1 (40) between both first and second sensor nodes 110*a*-110*b*.

As shown in FIG. 2, in this specific example the transmission component 120 is structured as an operational amplifier with the first input node 120*a* being the inverting (−) input node and the second input node 120*c* being the non-inverting (+) input node.

Returning to FIG. 1 in combination with FIG. 2, the magnetic bearing assembly 10 of FIG. 1 is being provided with a capacitive sensor device 100 as depicted in FIG. 2, with each second sensor node 110*b* of the sensor component 110 being positioned at the first side 33*a* of the ferromagnetic core.

FIG. 3 shows an example of a magnetic bearing assembly provided with a capacitive sensor device 100 according to the invention in more detail.

The first sensor node 110*a* of the capacitive sensor component 100 is mounted to the rigid body 20. A single core cable 130*a* serve to provide power to the frequency-dependent input signal generator 130 and for applying an oscillating voltage signal $V_{osc}$ to the first sensor node 110a. The second sensor node 110b of the capacitive sensor component 100 is mounted to the other rigid body 30, being shaped as a magnetic bearing assembly 30.

The magnetic bearing assembly 30 is provided with a housing 300. A part of the housing 300, denoted with reference numeral 310, is structured to support the second sensor node 110b of the capacitive sensor 100 on a first part side 310a thereof. The first part side 310a of the housing part 310 is facing away from the first side 31a of the ferromagnetic core 31.

Preferably, the housing part 310a supporting the second sensor node 110 of the capacitive sensor component 110 is made of a dielectric material, in particular glass. The housing part 310a being formed of a glass plate can have a thickness of 0.15 mm.

A shielding component 320 is mounted to the housing part 310 of the housing structured to support the second sensor node 110b of the capacitive sensor component 110 on a further side 310b thereof, the further part side 310b facing the first side 31a of the ferromagnetic core. The shielding component 320 serves as a passive guard area.

Both the measurement area formed by the second sensor node 110b and passive guard area or shielding component 320 can be formed as thin layers of 1-5 μm of silver (Ag), that are applied using a physical vapor deposition technique on both sides 310a and 310b of the housing part 310 (glass plate), respectively. It will be clear that other layer deposition techniques are available that can be more suitable for mass production.

In a further embodiment, the measurement layer area formed by the second sensor node 110b can have a comb like shape to minimize eddy currents, as the second sensor node 110b is located inside the magnetic field of the magnetic bearing module 30.

Alternatively, the glass plate 310a can be reinforced by gluing a waterjet cut glass frame with a thickness of 0.5 mm onto the further side 310b on top of the passive guard/shielding component 320.

Preferably, the other part of the housing 300 that is not supporting the second sensor node 110b of the capacitive sensor component 110 is operatively connected to ground potential 1000.

Most commercially available capacitive sensor devices use a single plate capacitive sensor design. This known measurement principle requires, when implemented in a magnetic bearing module according to FIG. 1, that the rigid body 20 (being the product carrier to be displaced) needs to be at ground potential. Thus, an oscillating voltage signal $V_{osc}$ needs to be provided to the other, further rigid body 30 (the linear guideway with the magnetic bearing module) on the measurement surface (second sensor node 110b) via a reference capacitor. A voltage signal is measured as the sensor output of the second sensor node 110b.

This known measurement principle thus requires the rigid body 20 to be at ground potential and the magnetic bearing module 30 with the second sensor node 110b (the measurement surface) to be at a variable potential. This measurement configuration has the disadvantage of having all components physically located close to the measurement surface/the second sensor node 110b to act as parasitic capacitances. To minimize the influence of these parasitic capacitances and to minimize edge effects, such as fringing of field lines, a secondary active guard surface functioning as active shield component needs to be implemented behind and around the measurement surface/the second sensor node 110b.

This active shield component is to be kept actively at the same voltage potential as the measurement surface/the second sensor node 110b, therefore the active shield component needs to be electrically isolated from both the measurement surface/the second sensor node 110b and from the sensor housing 300. Therefore, such known sensor design has a more complex mechanical structure and as a result larger constructional dimensions.

In addition, the signal cable connecting the known capacitive sensor device to the processing electronics is usually a tri-axial cable, the central core of which being used for the measurement signal, the middle conductor being used for the active guard signal towards the active shield component and the outer shielding being kept at ground potential for shielding purposes. In such design, the active guard signal line is located close to the outer shielding, which is kept at ground potential, and this type of cable configuration causes a relatively small capacitance to ground potential and poses higher demands on the unity gain amplifier, that generates the active guard signal for the active shield component.

As a consequence it can be more difficult to keep the active shield component at exactly the same potential in applications with signal cables of a significant longer length running from the known capacitive sensor device to the processing electronics.

The capacitive sensor device 100 according to the invention and as disclosed in FIGS. 2 and 3 differs from the known sensor design by mounting the frequency-dependent input signal generator 130 and thus applying the oscillating voltage signal $V_{osc}$ to the rigid body 20 (the displaceable product carrier) instead of having the rigid body 20 at ground potential 1000. This allows the sensor device's measurement surface to be kept at virtual ground potential 1000. The oscillating excitation signal $V_{osc}$ causes a current flow from the rigid body 20 (the displaceable product carrier) to virtual ground, depending on the amplitude of the oscillating voltage and the impedance $C_x$ of the capacitance between both sensor nodes 110a-110b between the rigid body 20 (the displaceable product carrier) and the magnetic bearing module 30.

The filter element or reference capacitor 140 ($C_{ref}$) is placed on the feedback path of the operational amplifier 120 between the output node 120b and the first input node 120a. The transmission component 120 (operational amplifier) applies a voltage $V_{out}$ at the output node 120b such that the current flowing through the filter element or reference capacitor 140 is equal to the current flowing from the rigid body 20/the capacitive sensor component 110 to virtual ground. Thus, the output voltage $V_{out}$ is a measure for the gap g1 (40) between the rigid body 20 (the product carrier) and the other rigid body 30 (the linear guideway).

Since the measurement part of the capacitive sensor device 100 (here the second sensor node 110b, and the capacitive sensor component 110) is effectively at ground potential 1000, an active shielding component can be omitted. Instead, a passive shielding component 320 is placed behind the second sensor node 110b in order to prevent metallic components from acting as parasitic capacitances. The absence of an active shielding component has several benefits:

The complex tri-axial signal cable in the known sensor device configurations as outlined above can be exchanged for a coaxial cable 100a with a smaller diameter and lower bending stiffness, the latter being beneficial in rotary cable feedthroughs. The central conductor of the coaxial cable 110a is used for the measurement signal Vow while the outer conductor is kept at ground potential 1000 and used for shielding.

The fact that the capacitive sensor device 100 according to the invention requires fewer active measurement surfaces and insulation layers makes it more suitable for integration inside the magnetic bearing module and close to or in the airgap 40 between the rigid body/product carrier 20 and the magnetic bearing module/linear guideway 30. This design with less complex electrical components optimizes a balance of cost, measurement accuracy, a minimal amount of cables and minimal energy dissipation.

Preferably, in a suitable application multiple magnetic bearing modules 30 are used in a linear guideway assembly requiring multiple capacitive sensor devices 100 according to the invention, which capacitive sensor devices 100 are to be placed on either a moving product carrier (the first rigid body 20) and the linear guideway 30. To further minimize the amount of signal cables running from the sensor probes towards to processing electronics, the several capacitive sensor devices 100 are electronically connected to a central controller or central electronic circuit board (PCB).

Figure 4:
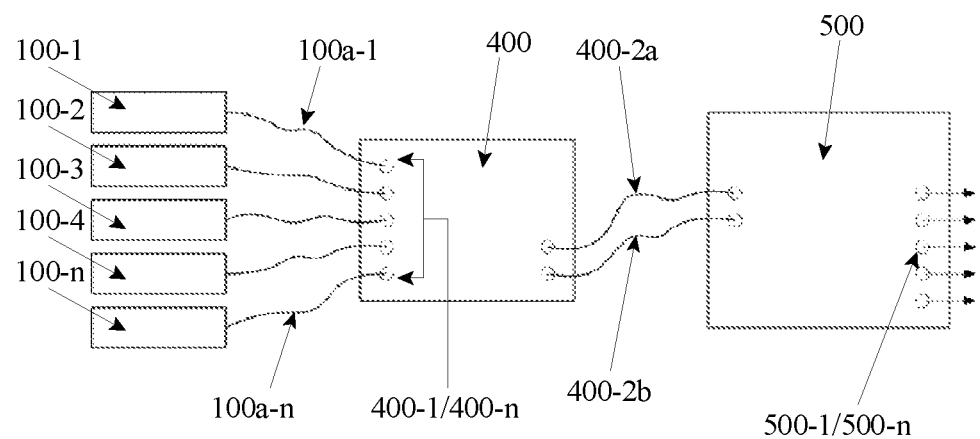
FIG. 4 a further detail of an embodiment of a capacitive sensor device according to the disclosure.

An example of such central controller or central electronic circuit board (PCB) 400 is shown in FIG. 4 and implements multiple functionalities. It includes the current measurement using a reference capacitor $C_{ref}$/filter element 140 as described with reference to FIG. 2. The central controller/central electronic circuit board (PCB) 400 has multiple input nodes 400-1; 400-$n$ conformal to the number of n capacitive sensor devices 100-1/100-$n$ being used.

A synchronous rectifier or synchronous detector combined with a filter are used to convert the various n oscillating measurement signals $V_{out}$ into corresponding n direct current (DC) measurement (voltage) signals for each measurement channel. The synchronous detection minimizes influence of disturbance signals. A total of five measurement signals of the corresponding n direct current (DC) measurement (voltage) signals are multiplexed into a single multiplexed output signal outputted via a single wire 400-2 and the signals are pre-amplified. This PCB design is designed to minimize the amount of signal cables, and thus minimizing power dissipation.

A total of two coax wires 400-2a/2b run from the pre-processing PCB 400 to the post-processing PCB 500 while carrying six different signals. One coax cable 400-2a carries the oscillating signal that is required for the synchronous detection, and this oscillating signal with an amplitude of ±12V is offset by −15V. The sheathing of the coax cable 400-2a is at +15V and includes a synchronization pulse for the de-multiplexer. The second coax cable 400-2b carries the multiplexed measurement signals while the sheathing carries the signal ground.

With this design the signal to noise ratio (S/R) is improved, and any influence of external noise sources is minimized by amplifying the measurement signals $V_{out}$ close to the capacitive sensor device 100. Analog to digital conversion (A/D) is done at the post-processing PCB 500, not at the pre-processing PCB 400 in order to minimize energy dissipation at the PCB 400. This configuration allows for application inside a vacuum environment, where thermal stability is of high importance.

LIST OF REFERENCE NUMERALS

10 magnetic bearing assembly
20 rigid body
30 other rigid body
30' magnetic bearing module
31 ferromagnetic core
31a first side of the ferromagnetic core
32a-32b outer legs of ferromagnetic core
33 center leg of ferromagnetic core
33a free end face of the center leg
34 first magnetic element
35 coil
40/g1 air gap
100 capacitive sensor device
100a coaxial signal cable of capacitive sensor device
110 a capacitive sensor component
110a first sensor node
110b second sensor node
120 transmission component
120a first input node of transmission component
120b output node of transmission component
120c first input node of transmission component
130 frequency-dependent input signal generator
130a single core signal cable of frequency-dependent input signal generator
140 filter element
300 housing of magnetic bearing module/capacitive sensor device
310 part of housing
310a first part side of housing part 310
310b further or second part side of housing part 310
320 shielding component
400 pre-processing circuit board PCB
500 post-processing circuit board PCB
1000 ground potential

The invention claimed is:

1. A capacitive sensor device for determining a distance between a rigid body and another rigid body in a system for contactless linear displacement along a linear displacement path of the rigid body relative to the other rigid body, the capacitive sensor device comprising:
    a capacitive sensor component with a first sensor node mounted to the rigid body and a second sensor node mounted to the other rigid body;
    a transmission component having at least a first input node for receiving an input signal as well as an output node for providing an output signal representative of the distance;
    a frequency-dependent input signal generator operatively connected to the first sensor node of the capacitive sensor component and
    the first input node of the transmission component being operatively connected to the second sensor node of the capacitive sensor component.

2. The capacitive sensor device according to claim 1, further comprising at least one filter element operatively connected to the output node and the first input node of the transmission component.

3. The capacitive sensor device according to claim 2, wherein the transmission component is structured to output the output signal in response to a frequency-dependent change of the input signal.

4. The capacitive sensor device according to claim 1, wherein the transmission component has a second input node operatively connected to ground potential.

5. The capacitive sensor device according to claim 4, wherein the transmission component is structured as an operational amplifier with the first input node being the inverting input node and the second input node being the non-inverting input node.

6. A magnetic bearing assembly in a system for contactless linear displacement along a linear displacement path of a rigid body relative to another rigid body, the magnetic bearing assembly comprising:
   at least one first static back iron being mounted to the rigid body; and
   at least one magnetic bearing module being mounted to the other rigid body and consisting of at least:
      a ferromagnetic core;
      a first magnetic element positioned on a first side of the ferromagnetic core facing the first static back iron;
      a coil being wound around the ferromagnetic core; and
      a capacitive sensor device for determining a distance between a rigid body and another rigid body in a system for contactless linear displacement along a linear displacement path of the rigid body relative to the other rigid body, the capacitive sensor device comprising:
         a capacitive sensor component with a first sensor node mounted to the rigid body and a second sensor node mounted to the other rigid body;
         a transmission component having at least a first input node for receiving an input signal as well as an output node for providing an output signal representative of the distance;
         a frequency-dependent input signal generator operatively connected to the first sensor node of the capacitive sensor component and
         the first input node of the transmission component being operatively connected to the second sensor node of the capacitive sensor component.

7. The magnetic bearing assembly according to claim 6, wherein the second sensor node of the capacitive sensor device is positioned at the first side of the ferromagnetic core.

8. The magnetic bearing assembly according to claim 7, further comprising a housing, wherein a part of the housing is structured to support the second sensor node of the capacitive sensor on a first part side thereof, the first part side facing away from the first side of the ferromagnetic core.

9. The magnetic bearing assembly according to claim 8, wherein the part of the housing supporting the second sensor node of the capacitive sensor being made of a dielectric material, in particular glass.

10. The magnetic bearing assembly according to claim 8, wherein the other part of the housing not supporting the second sensor node of the capacitive sensor is operatively connected to ground potential.

11. The magnetic bearing assembly according to claim 8, further comprising a shielding component mounted to the part of the housing structured to support the second sensor node of the capacitive sensor on a further side thereof, the further part side facing the first side of the ferromagnetic core.

12. The magnetic bearing assembly according to at least claim 8, wherein the part of the housing supporting the second sensor node of the capacitive sensor has a comb-like area shape.

13. A linear guideway assembly being composed of a rigid body formed as a linear guideway defining a linear displacement path as well as one or more rigid bodies formed as product carriers being displaceable along said linear guideway, wherein said linear guideway assembly further comprises:
   one or more magnetic bearing assemblies comprising:
      at least one first static back iron being mounted to the rigid body; and
      at least one magnetic bearing module being mounted to the other rigid body and consisting of at least:
         a ferromagnetic core;
         a first magnetic element positioned on a first side of the ferromagnetic core facing the first static back iron;
         a coil being wound around the ferromagnetic core; and
         one or more capacitive sensor devices for determining a distance between a rigid body and another rigid body in a system for contactless linear displacement along a linear displacement path of the rigid body relative to the other rigid body, the one or more capacitive sensor devices comprising:
            a capacitive sensor component with a first sensor node mounted to the rigid body and a second sensor node mounted to the other rigid body;
            a transmission component having at least a first input node for receiving an input signal as well as an output node for providing an output signal representative of the distance:
            a frequency-dependent input signal generator operatively connected to the first sensor node of the capacitive sensor component and
            the first input node of the transmission component being operatively connected to the second sensor node of the capacitive sensor component.

14. The linear guideway assembly according to claim 13, further comprising a central controller having multiple input nodes, each input node being electronically connected to the output node of a capacitive sensor device.

15. The linear guideway assembly according to claim 14, wherein the central controller is structured to convert each oscillating output signal representative of the distance and being input to one of the multiple input nodes into a direct current measurement signal.

16. The linear guideway assembly according to claim 15, wherein the central controller further comprises a multiplexer for multiplexing a number of the multiple direct current measurement signals in a single multiplexed output signal.

17. The linear guideway assembly according to claim 16, wherein the central controller further comprises a pre-amplifier component for pre-amplifying the single multiplexed output signals.

* * * * *